United States Patent [19]

Davis

[11] Patent Number: 4,682,165

[45] Date of Patent: Jul. 21, 1987

[54] APPARATUS FOR INHIBITING REPETITIVE MESSAGE DETECTIONS IN A ZONE BATCHED COMMUNICATION SYSTEM

[75] Inventor: Walter L. Davis, Coral Springs, Fla.

[73] Assignee: Motorola, Inc., Schaumburg, Ill.

[21] Appl. No.: 794,993

[22] Filed: Nov. 4, 1985

[51] Int. Cl.[4] .................. H04Q 7/00; G08B 5/22; H04B 7/00

[52] U.S. Cl. .................. 340/825.5; 340/825.44; 340/825.48; 455/33; 455/58

[58] Field of Search .................. 340/825.44, 825.45, 340/825.47, 825.48, 825.5; 455/33, 58, 228; 370/95; 379/59, 60

[56] References Cited

U.S. PATENT DOCUMENTS

| 4,144,409 | 3/1979 | Utano et al. | 455/33 |
| 4,160,240 | 7/1979 | Partipilo | 340/311 |
| 4,389,643 | 6/1983 | Hill | 340/825.48 |
| 4,414,661 | 11/1983 | Karlstrom | 455/33 |
| 4,419,668 | 12/1983 | Ganucheau, Jr. | 340/825.44 |

FOREIGN PATENT DOCUMENTS 2739561 3/1979 Fed. Rep. of Germany ........ 455/33

Primary Examiner—Ulysses Weldon
Assistant Examiner—Ralph E. Smith
Attorney, Agent, or Firm—Winfield J. Brown, Jr.; Joseph T. Downey; Anthony J. Sarli, Jr.

[57] ABSTRACT

A logic circuit is provided in a multifunction selective call receiver operating in a time sequential zone batched message communication system to prevent repeated alerts of the same message. A single lockout timer is reset by the first detection of a message function signal, and further alerts for that function are disabled for a time interval which may be extended by additional message function detects corresponding to other functions.

16 Claims, 4 Drawing Figures

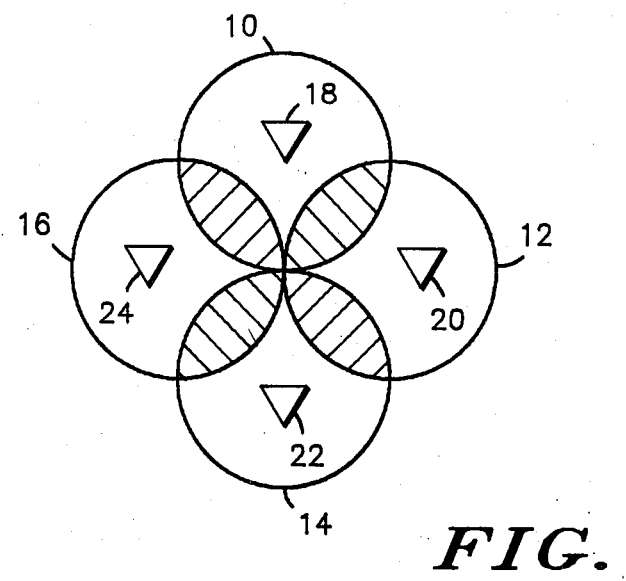
*FIG. 1*
*FIG. 2*
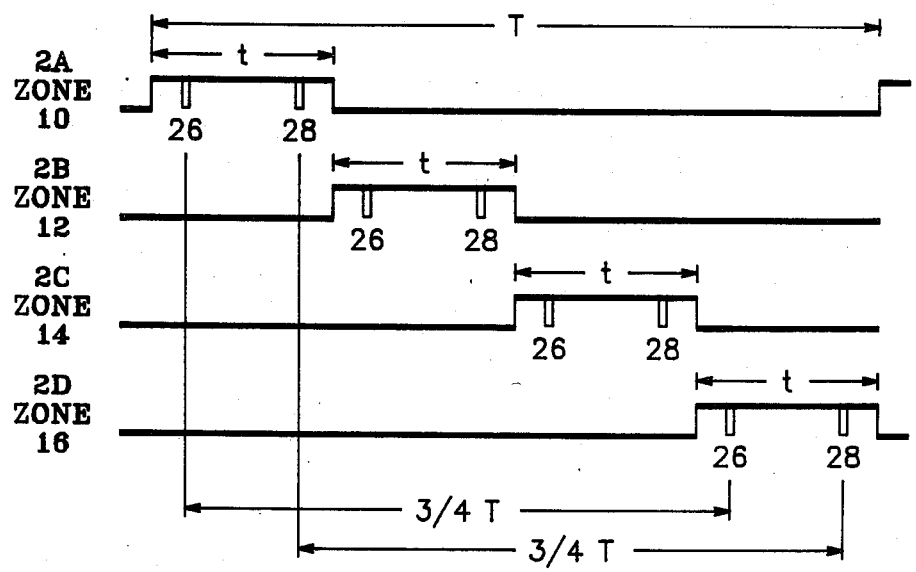

APPARATUS FOR INHIBITING REPETITIVE MESSAGE DETECTIONS IN A ZONE BATCHED COMMUNICATION SYSTEM

BACKGROUND OF THE INVENTION

This invention relates generally to the field of zone batched communications systems and more particularly to multifunction receivers operating in such systems.

DESCRIPTION OF THE PRIOR ART

In many countries of the world, in particular in Great Britain and Holland, large area or nationwide paging systems are divided into geographic signalling zones. In each zone, a base station transmitter is on the air on a time sequence basis, and paging messages are transmitted in batches which are serially retransmitted on a zone-by-zone bases until a given group or batch of messages has been transmitted in all zones. The entire process is then repeated with a new batch of paging messages.

In such type of a sequential zone communication system, any individual pager could well be within the range of more than one transmitter and thus receive the same paging message from two different zone transmitters at two different times. To prevent such a pager from alerting twice to the same message, sequential lock-out timers have been used to disable the pager for a given period of time following the receipt of a message. Setting the length of a lock-out time interval equal to the time required for a batch of pages to be transmitted in all zones effectively eliminates the multiple alerting problem.

In the case of a multifunction pager, a simple lock-out timer will no longer work properly because the pager can now receive more than one message in a given transmission batch. If the pager were to be disabled for a fixed period of time following the receipt of a paging message, paging messages relating to the activation of other functions of a multifunction pager would be missed. One method of correcting this problem would be to use an individual timer for each of the several functions of the pager. However, the inclusion of this circuitry with its added bulk and cost, make it technically and economically prohibitive.

OBJECTS OF THE INVENTION

It is an object of the present invention to provide an apparatus for inhibiting the repetitive detection of message signals transmitted to a multifunction communication receiver operating in a zone batched message communication system.

It is a further object of the present invention to utilize a single lock-out timer to prevent the multiple detection of a single message while permitting detection of more than one message in a given batch in a system in which zone batch messages are transmitted to a multifunction receiver.

It is still a further object of the present invention to utilize a single lock-out timer suitably programmed with a lock-out period that is dependent upon the number of zones in the communication system and which is actuated by the detection of one of several multiple functions in a predetermined time period.

SUMMARY OF THE INVENTION

Brief Description of the Drawings

Features of the invention which are believed to be novel are set forth with particularity in the appended claims. The invention itself, however, together with its further objects and advantages thereof, may be best understood by reference to the following description. When taken in conjunction with the accompanying drawings in which:

FIG. 1 shows in diagram form a zone batched message communications system.

FIGS. 2A–D show in time sequence, the zone transmissions for the individual zones of the zone batched communication system shown of FIG. 1.

Description of the Preferred Embodiment

Figure 3:
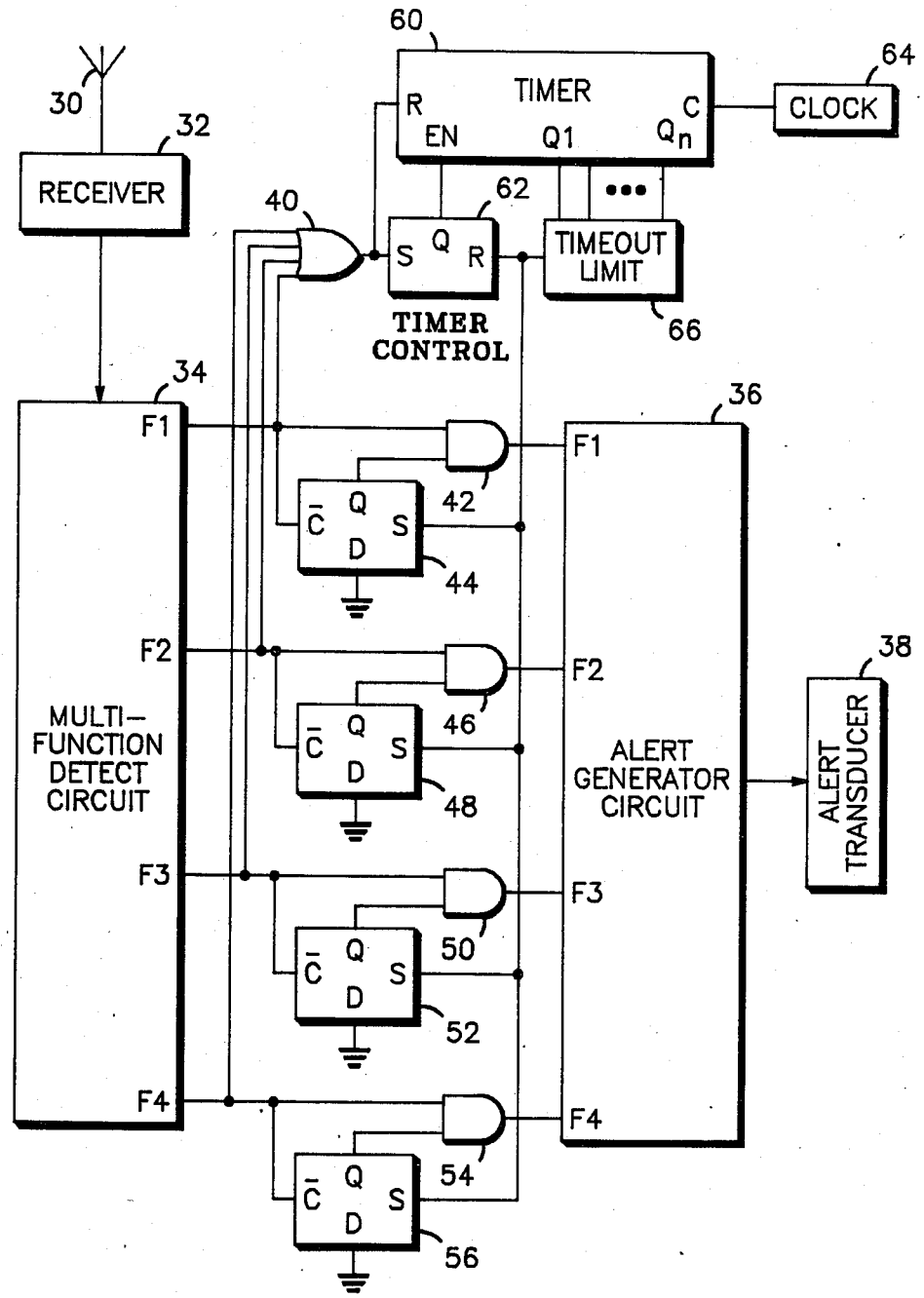
FIG. 3 shows a detailed electrical schematic diagram of the preferred embodiment of the present invention.

FIG. 1 shows in diagramatic form, four generally circular message transmission zones designated 10, 12, 14, and 16 having overlap regions which have been shaded for enhancement. The overlap regions show an overlap of only two zones while it is conceivable there could be an overlap of three or more zones. In each of zones 10, 12, 14, and 16 are shown antennae 18, 20, 22, and 24 respectively, representing the base station or transmitter for the communication system within each zone. Those skilled in the art will appreciate that the concept of such zones and the sequential activation of the base station transmitters in a zone-by-zone time sequence is well known in the art. Further, the batching of messages and the distribution of messages from a central location to the individual base stations and subsequent transmission from the appropriate transmitters located in the zones is also well known in the art.

While FIG. 1 shows a particular combination of overlap regions, it is not intended to be limiting and only representative of the fact that there exist overlap regions among the various zones. The overlap regions can cause a problem for a multifunction receiver since it could receive the same message signals from either of two base stations sequentially in time. Thus, the receiver user could receive two alerts from each of two transmitters which would normally indicate the reception of two distinct messages. This multiple alerting for the same message in a zone batched system in a particular annoyance for pager users since they can never tell whether the second message would be a repetition of the first or a new message.

As has been described, prior art systems lock out the operation of a receiver for one entire cycle of the transmission time for the batch to be transmitted in the various zones. Thus, if a receiver receives one message, the prior art timing devices would disable the receiver for one entire total transmission time for a batch. For a multifunction receiver, there is a strong possibility that there could be more than one message directed to that receiver in each batch. Thus, it will be appreciated that the prior art solution causes the complete disabling of a multifunction receiver after the receipt of a first message and hence can contribute to a lost message or improperly received message problem with the zone batched communication system.

To more clearly understand the operation of the zone transmission sequence, FIGS. 2A–D show a timing sequence in which FIGS. 2A, B, C, and D represent transmissions to zones 10, 12, 14, and 16 respectively which is used to disseminate the same batched information to the various zones. In each of zones 10, 12, 14, and 16 transmitters are sequentially activated and the same information is transmitted for the same time duration (t) in each zone. The total time for the transmission designated as capital T is shown in FIG. 2. In the example of 4 zones as shown in FIG. 1, T=4t. That is then the total time that the prior art transmission lock-out device would disable a pager.

As may be seen in FIG. 2, it is possible during each batch to have more than one function message sent to an individual receiver. This is shown as signals 26 and 28 occurring during the transmission duration for each of the four zones. Each of zones 10 through 16 contains signals 26 and 28 to show that a message has been sent to both function 1 and function 2 of the same addressed receiver. The problem then is that if the pager is in an overlap region of two zones, it should detect and alert the user only for the receipt of two distinct messages, not the receipt of four or more. The present invention corrects this problem in a novel and economically feasible manner.

Also shown in FIG. 2 is the desired timeout interval which should be used after the detection of a single function. The correct timeout interval is, for the four zones shown in FIG. 1, $\frac{3}{4}$T where T is the total batch time for the four zones. FIG. 2 shows that this timeout period is appropriate for a single function detection regardless of when during the zone transmission duration the signal is detected. It will be appreciated by those skilled in the art that any system propagation time delays and the gate time delay of a receiver device should be taken into consideration in determining the lockout time intervals which will be described later in greater detail.

FIG. 3 shows a detailed combined functional block diagram and electrical schematic diagram of the preferred embodiment of the present invention. An antenna 30 is coupled to a receiver 32 which receives, detects, and decodes the presence of the correct multifunction receiver address of a receiving device and sends that information to a multifunction detect circuit 34. The detailed circuitry for antennae and receivers capable of operating in zone batched communication systems is well known in the art, and it is not necessary to include the detailed interconnections here. Moreover, the multifunction detect circuit 34 is also well known in the art, and such multifunction circuits have been operating in any of a number of different coding systems which include Golay sequential and POCSAG paging systems, all of which systems are well known in the art. Examples of multifunction receivers capable of operating in the preferred embodiment may be found in U.S. Pat. No. 4,160,240 issued July 3, 1979, to Partipilo and entitled "Binary Digital Pager Having An Eight Function Code Read-Out", and U.S. Pat. No. 4,419,668 issued Dec. 6, 1983, to Ganucheau and entitled "Combined Tone Only and Tone Voice Multiple Alert Pager", which patents are commonly assigned to the assignee of the present application and are hereby incorporated by reference.

For simplicity, multifunction detection circuit 34 is shown to have four different alerting function output terminals. The four output terminals of multifunction detector 34 are labelled F1, F2, F3, and F4, each one corresponding to the detection of the combination of the appropriate receiver address and the designation of an individual function. The different functions can take on many forms as different types of displays and are generally categorized as the alerting type the receiver is to execute. From the receiver users point of view, the function detect signals at these four terminals may be used to distinguish among four different message sources, four different priorities of message, or whatever the communication system may establish as a standard interpretation for message purposes. In prior art circuits, the outputs of F1, F2, F3, and F4 of multifunction detect circuit 34 would be directly connected to an alert generator circuit 36, which would then be coupled as indicated through an alert transducer 38. For such prior art receivers with a single lockout timer in a zone or batched communication system, receipt of any message would cause the receiver to be disabled for the entire transmission time T.

However, in the preferred apparatus for the present invention, output F1 from multifunction detection circuit 34 is coupled to the first input of an OR gate 40, the first input to an AND gate 42, and the C bar (inverse clock) input of a D-type flip-flop 44. The F2 output of multifunction detect circuit 34 is coupled to the second input of OR 40, the first input of an AND 46, and the C bar input of a D-type flip-flop 48. The F3 output of multifunction detect circuit 34 is connected to the third input of OR 40, the first input of an AND 50, and the C bar input of D-type flip-flop 52. The F4 output of multifunction detect circuit 34 is coupled to the fourth input of OR 40, the first input of an AND 54, and to the C bar input of a D-type flip-flop 56. Each of D-type flip-flops 44, 48, 52, and 56 have their D terminal grounded. The Q outputs of each of D-type flip-flops 44, 48, 52, and 56 are coupled as the second input to AND gates 42, 46, 50, and 54 respectively.

The output of OR gate 40 is coupled to the reset input of timer circuit 60 and to the set input of timer control circuit 62. Timer control 62 has its Q output coupled to the enable input of timer 60. The Q1 through QN outputs of timer 60 are coupled to a timeout limit circuit 66. The reset output of timer control latch 62 and the timeout limit output circuit 66 are coupled together and to each of the set inputs of AND gates 44, 48, 52, and 56 which operate as inhibit latches.

The output of AND gates 42, 46, 50, and 54 are coupled appropriately to the F1, F2, F3, and F4 inputs of alert generator circuitry 36 which has been described as having its output coupled to drive alert transducer 38. As the detection of each of the four possible functions is confirmed, the appropriate alerting protocol is initiated and the receiver user receives the correct alerting corresponding to the detected function.

In operation, the data from receiver 32 is applied to the input of multifunction selective signalling decoder 34. The decoder in turn has a number of function detect output signal terminals F1, F2, F3, and F4 and each of these outputs is applied as one input of a corresponding detect gate. AND gates 42, 46, 50, and 54 are the detect gates which indicate the detection within one batch time interval of one of the multifunction signals. The system shown contains a single lock-out timer that is started or restarted whenever a non-repeated function is detected. That is, whenever a first function detect signal is generated by the function detect circuit 34 for any of the functions, a corresponding output signal occurs at one of outputs F1 to F4. Timer 60 would normally be stopped whenever it reaches programmable count limit contained in timeout limit circuit 66 which is a predetermined function of the number of zones in which the system is operating.

As may be seen in FIG. 3, a series of D-type flip-flops employed as inhibit latches and designated 44, 48, 52, and 56, are used for the control of the operation of the function detect gates. The sequential lockout timer 60 operates from clock source 64 and is reset via OR 40 by the detection of any of the multifunctions possible for this type of receiver. At the actuation of the output of OR gate 40, the timer is reset, timer control circuit 62 is set and the Q output enables the operation of timer 60 to receive clock pulses from clock 64. The operation of the sequential lockout timer 62 is as a control timer which selectively inhibits the repeated detection of any function within the preselected time delay. That is, after the detection of any of the possible multifunction signals, the lockout timer is activated and the alert generator circuit cannot respond to an additional reception of that function signal for the duration of the lockout interval. While the circuit acts to prevent repeated alerts corresponding to the same function, it allows the detection and alerting of other functions, thus ensuring that valid messages are not missed.

Upon initial detection of the first address and function signal, multifunction detect circuit 34 generates a function detect signal (one level) that is applied to one input of the corresponding detect AND gate. If another alert has not been generated for that function within the lockout time interval, the Q output of the corresponding D-type flip-flop operating as an inbibit latch will also be at one level, allowing the detected function signal to generate a signal at the output of the corresponding detect AND gate. This signal in turn causes the alert generator circuit to generate an appropriate output alert which is applied to alert transducer 38. The detect output signal from multifunction detect circuit 34 also sets timer control latch 62 and resets timer 60, thus starting the timer from a reset condition. When the detect output signal reverts to its normal zero level, the inhibit latch is clocked to the state that gives a zero level at its Q output which disables the corresponding detect AND gate. Then if another signal for that function is detected during the lock-out time interval, the detect AND gate does not generate an output signal due to the zero input thus maintaining the detect gate output at a zero level signal. When timer 60 reaches the predetermined count limit designated by programmable timeout limit circuit 66 the timer control latch is reset, the timer is stopped, and all of the inhibit latches are cleared by having the Q output set to 1 logic level, thus all functions are again free to generate alerts.

If after the detection of one function but before a timeout limit has been released, a second function is detected while timer 60 continues to run, multifunction detect circuit 34 can still generate a detect signal at the output of the corresponding detect gate for that function as well as for any remaining function for which the corresponding detect gate has not been inhibited. Thus, additional alert signals can be generated for those functions that have not already generated an alert during the present timeout interval.

When a second or third or fourth function is detected, the inhibit latch for that functionis set to zero to inhibit further alerts, and timer 60 is reset to begin timing out a new lockout interval. At the end of the new timeout period as determined by the timeout limit circuit 66, timer 60 is stopped as before, and all of the inhibit latches are cleared to allow for alerts on all functions. Thus, this invention effectively employs a single timer to provide for individual lockout of each once alerted function.

Figure 4:
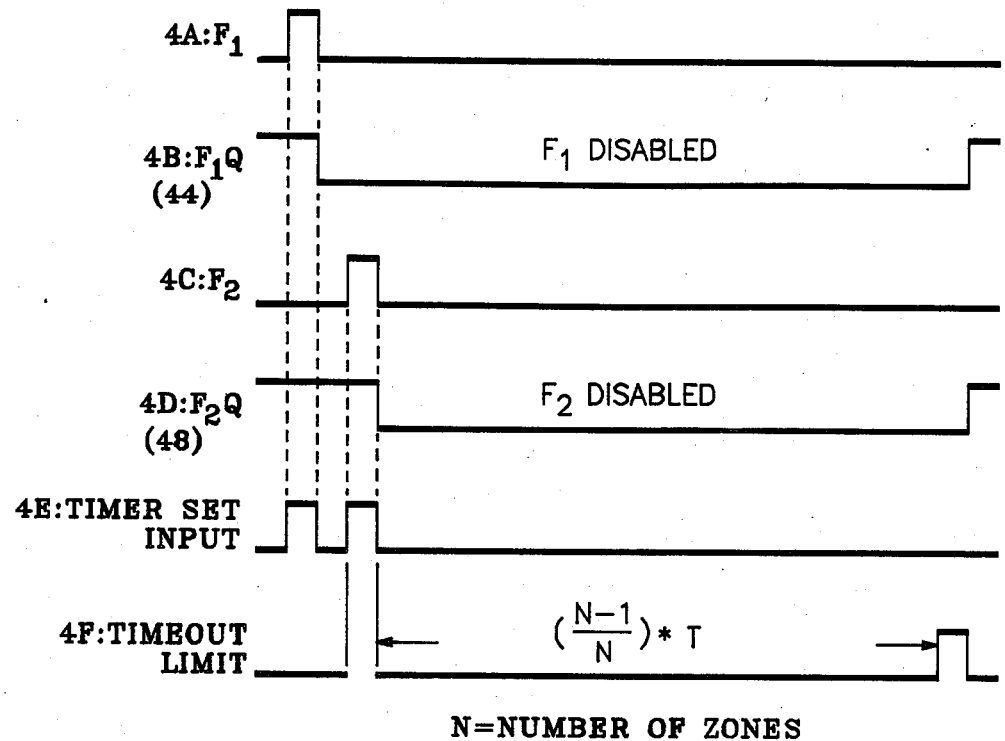
FIGS. 4A–F show a timing diagram for the activation timeout limit for two distinct functions of a multifunction receiver operating in the system of FIG. 3.

As may be more clearly seen in FIGS. 4A-F, functions 1 and 2 are shown to have been detected in a single batch transmission from a single zone transmitter. FIG. 4A shows the detect signal at the F1 terminal of multifunction detect circuit 34, and FIG. 4B shows the corresponding logic state for the Q output of inhibit latch 44. Similarly, FIG. 4C shows the detect signal of the F2 terminal of multifunction detect circuit 34 during the time interval generated by the previous detection of a signal at F1, and FIG. 4D shows the corresponding logic state for the Q output of inhibit latch 48. As may be seen, the Q output of inhibit latch 44 for function 1 is disabled at the termination of the detection of the function 1 detect signal. Thus for the timing interval, F1 will be disabled from indicating a further alert. During the timing interval in which F1 is disabled, a function 2 detect is shown. FIG. 4D shows that the Q output of the function 2 inhibit latch will be at a zero level to inhibit the operation of the detect F2.

As may be seen more clearly in FIG. 4E, the timer set input signal will occur during the detection of any of the possible functions, that is, any of the first occurrence of a detection of an individual function. FIG. 4F shows that the time limit is then calculated from the termination of the latest timer set input during a given timeout interval. Thus the first function alert may be inhibited for more than the predetermined limit since the detection of a second function will reset the time and continue the alert inhibit until the timeout measured from the last valid function detect from a given zone. As may also be seen, the general equation for the proper timeout limit is given by the equation $T * (N-1)/N$, here T is the total transmission time for various zones, where N is the number of zones in the system.

Thus what has been shown in an apparatus employing a single resettable timer used to inhibit multiple alerts of an individual function in multifunction receiver operating in a zone batched communication system after a first alert has been detected.

What is claimed is:

1. A multifunction receiver for generating a plurality of alerts, each alert associated with a function, the receiver being adapted for operation in a time sequential zone batched message communication system having a plurality of zone comprising:

receiver means for receiving selective call signals transmitted in a first zone;

function detection means responsive to said receiver means for identifying a selective call signal designating the actuation of one of said multifunctions and producing a corresponding control signal in response thereto;

alert means coupled to said function detection means and responsive to said control signal for producing an alerting signal corresponding to the function detected; and logic means coupled between said detection means and said alert means for storing the control signal and for disabling a second control signal generated in response to receiving the selective call signal from a second zone for a previously detected function, from being supplied to said alert means for a derived time interval.

2. The receiver of claim 1 wherein said logic means further includes a single resettable clock means which is responsive to and reset by the generation of first control signals for each of said functions.

3. The receiver of claim 2 wherein said clock means is coupled to timeout limit means for determining a maximum allowable clock time interval measured by said clock means.

4. The receiver of claim 3 wherein said timeout limit means re-enables the supply of control signals to said alert means for all of said multifunctions.

5. The receiver of claim 4 wherein said maximum allowable clock time interval is determined by the formula $T * (N-1)/N$ where N is the number of time sequential zones in the communication system and T is the total system transmission time for all zones for a batch of messages.

6. The receiver of claim 5 wherein said derived time interval lies between the magnitude of said maximum allowable clock time interval and the total system transmission time for a batch of messages.

7. The receiver of claim 2 wherein said logic means includes detect logic gates responsive to the outputs of said function detection means and corresponding inhibit latches for selectively disabling the supply of second control signals to said alert means.

8. The receiver of claim 7 wherein said detect logic gates are initially enabled to supply first control signals to said alert means and said inhibit latches are set to disable said detect gates from supplying a second control signal to said alert means.

9. The receiver of claim 8 wherein said clock means is coupled to timeout limit means for determining a maximum allowable clock time interval measured by said clock means.

10. The receiver of claim 9 wherein said timeout limit means resets said inhibit latches to re-enable said detect gates.

11. The receiver of claim 10 wherein said maximum allowable clock time interval is determined by the formula $T * (N-1)/N$, where N is the number of sequential zones in the communication system and T is the total system transmission time for all zones for a batch of messages.

12. The receiver of claim 11 wherein said derived time interval lies between the magnitude of said maximum allowble clock time interval and the total system transmission time for a batch of messages.

13. A method for inhibiting repetitive message detections in a paging receiver operating in a time sequential zone batched communication system, the system having a plurality of zones and the paging receiver being adapted for receiving a plurality of selective call signals, wherein each selective call signal is associated with a corresponding function of the paging receiver for generating an alert, and wherein the paging receiver includes a function detection means, a plurality of alert functions, a timing means, and a logic means, said method including the steps of:
(a) receiving and detecting selective call signals transmitted in a first zone;
(b) identifying a selective call signal designating the actuation of one of said plurality of alert functions and generating a corresponding first function control signal in response thereof;
(c) generating a corresponding alert in response to the first function control signal;
(d) activating the timing means in response to the first function control signal, the timing means being adapted for generating a timeout signal depending on the number of zones;
(e) inhibiting, with the logic means, the actuation of a second alert for the same function generated by the reception and detection of the selective call signal transmitted from a second zone while permitting the actuation of a first alert for a different function upon reception of and detection of a corresponding selective call signal; and
(f) resetting the logic means for the actuation of an alert function from any zone in response to the timeout signal.

14. The method of claim 13 wherein logic means includes a logic gate and a latch means for each alert function and wherein step (e) of inhibiting further includes the steps of:
(g) detecting at the logic gate a function control signal;
(h) generating an alert in response to the function control signal;
(i) storing at the latch means the function control signal; and
(j) inhibiting the actuation of a second alert in the presence of a previously stored function control signal.

15. The method of claim 13 wherein step (d) of activating further includes the step of computing a time-out signal for inhibiting the repetition of a previous generated alert from being produced until after reception of the selective call signal in the last zone of transmission.

16. The method of claim 15 wherein step (d) of activating further includes the step of computing a time-out signal by the formula $T * (N-1)$ where N is the number of time sequential zones in the communication system and T is the total system transmission time for all zones for a batch of messages.

* * * * *